United States Patent [19]

Wittenburg

[11] Patent Number: 4,985,854

[45] Date of Patent: Jan. 15, 1991

[54] METHOD FOR RAPID GENERATION OF PHOTO-REALISTIC IMAGERY

[75] Inventor: Timothy M. Wittenburg, North Chelmsford, Mass.

[73] Assignee: Honeywell Inc., Minneapolis, Minn.

[21] Appl. No.: 351,466

[22] Filed: May 15, 1989

[51] Int. Cl.$^5$ .................. G06F 15/72; G09B 9/30; G09B 9/34

[52] U.S. Cl. .................. 364/522; 434/43; 340/729

[58] Field of Search .............. 364/443, 449, 456, 522, 364/521; 434/38, 43; 340/729

[56] References Cited

U.S. PATENT DOCUMENTS

| | | | |
|---|---|---|---|
| 3,943,344 | 3/1976 | Kidode et al. | 364/562 |
| 4,017,985 | 4/1977 | Heartz | 434/2 |
| 4,313,678 | 2/1982 | Colvocoresses | 356/2 |
| 4,421,484 | 12/1983 | Wakeling et al. | 434/3 |
| 4,583,185 | 4/1986 | Heartz | 364/521 |
| 4,584,646 | 4/1986 | Chan et al. | 364/449 |
| 4,609,993 | 9/1986 | Shimizu | 364/522 |
| 4,660,157 | 4/1987 | Beckwith et al. | |
| 4,682,160 | 7/1987 | Beckwith et al. | 340/729 |
| 4,685,068 | 8/1987 | Greco, II et al. | 364/518 |
| 4,805,121 | 2/1989 | Scott et al. | 364/522 |
| 4,819,192 | 4/1989 | Kuragano et al. | 364/522 |
| 4,821,210 | 4/1989 | Rumbaugh | 364/518 |
| 4,821,212 | 4/1989 | Heartz | 364/521 |

Primary Examiner—Dale M. Shaw
Assistant Examiner—Raymond J. Bayerl
Attorney, Agent, or Firm—Haugen and Nikolai

[57] ABSTRACT

A method for providing rapid generation of photo-realistic imagery for use in a display system. The display system includes a memory which contains first and second ortho-rectified data layers. The first data layer includes a digitized photograph of known resolution together with spacing values and the second layer includes digitized elevation data corresponding to the photograph in the first data layer. The method includes the steps of scanning corresponding portions of the first and second data layers out of memory, removing hidden surfaces from the scanned portions, dividing the scanned portions into a plurality of two pixel by two pixel cells so as to form the cells using adjacent pixels from the data layer, further dividing the cells into triangular sections having vertices, projecting the vertices into the viewscreen using the coordinates in the second layer and the known spacing values, and shading the area subtended by the projected vertices. In one embodiment of the invention, the hidden surfaces are removed through an application of a modified Painters Algorithm. An alternate embodiment of the invention uses a Z-buffer to provide hidden surface removal.

4 Claims, 4 Drawing Sheets

METHOD FOR RAPID GENERATION OF PHOTO-REALISTIC IMAGERY

BACKGROUND OF THE INVENTION

The present invention is directed generally to graphic display systems and, more particularly, to a method for rapid generation of photo-realistic imagery from down-looking sensor imagery in real time in a graphics system, such as a digital map system or mission-rehearsal part-task trainer.

Currently, it is desirable both in certain aircraft and aircraft training simulators to display terrain data or aeronautical chart data on a graphics display terminal. Such a display might include a digital map of aeronautical charts, radar display imagery, or other types of imagery based upon photographs and other digitized data.

In the area of digital maps, for example, it is desirable to have the capability to display perspective views of terrain, for example. Aircraft crew effectiveness increases with increases in the realism of the displayed information. In an aircraft environment, for example, crew situational awareness is increased through the addition of a perspective view map display to a plan view capability which already exists in state-of-the-art digital map systems. See, for example, assignee's co-pending application Ser. No. 07/192,798, for a DIGITAL MAP SYSTEM, filed May 11, 1988. Similarly, the addition of a three-dimensional display capability would enhance the performance of systems, such as side-looking land-mass radar systems, and aircraft trainers. In such systems, it is important to generate the displays in real time (i.e. at a rate of 30 images per second).

An illustration of the results of the invention is shown in FIG. 11b. FIG. 11a is a typical downlooking photograph which, when combined with DMA elevation data using the method of the invention, results in striking sidelooking views as is typified by FIG. 11b.

SUMMARY OF THE INVENTION

A method for providing rapid generation of photo-realistic imagery for use in a display system is provided. The display system includes a memory which contains first and second ortho-rectified data layers wherein the first data layer comprises a digitized photograph of known resolution together with spacing values and the second layer comprises digitized elevation data corresponding to the photograph in the first data layer. The method comprises the steps of scanning corresponding portions of the first and second data layers out of memory, removing hidden surfaces from the scanned portions, dividing the scanned portions into a plurality of two pixel by two pixel cells so as to form the cells using adjacent pixels from the data layer, further dividing the cells into triangular sections having vertices, projecting the vertices into the viewscreen using the coordinates in the second layer and the known spacing values, and shading the area subtended by the projected vertices.

In one embodiment of the invention, the hidden surfaces are removed through an application of a modified Painters Algorithm. An alternate embodiment of the invention would use a Z-buffer to provide hidden surface removal.

It is one object of the invention to provide a method for providing rapid generation of photo-realistic imagery from a digitized down-looking area photograph which has been combined and registered with digital terrain elevation data.

It is another object of the invention to produce side views of an original, down-looking photograph from any three-dimensional viewpoint.

It is yet another object of the invention to provide a computer algorithm for producing a three-dimensional graphic display of digitized terrain data in real time.

Other objects, features and advantages of the invention will become apparent to those skilled in the art through the description of the preferred embodiment, claims and drawings herein. In the drawings, like reference numerals refer to like elements.

DESCRIPTION OF THE PREFERRED EMBODIMENT

Figure 1:
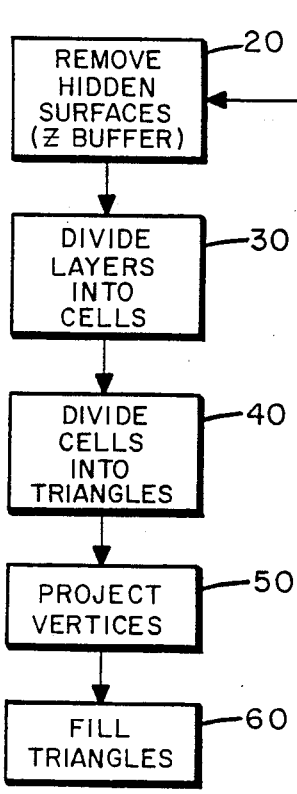
FIG. 1 shows a flow chart of the method of the invention for a rapid database generation of side-looking imagery.
Figure 2:
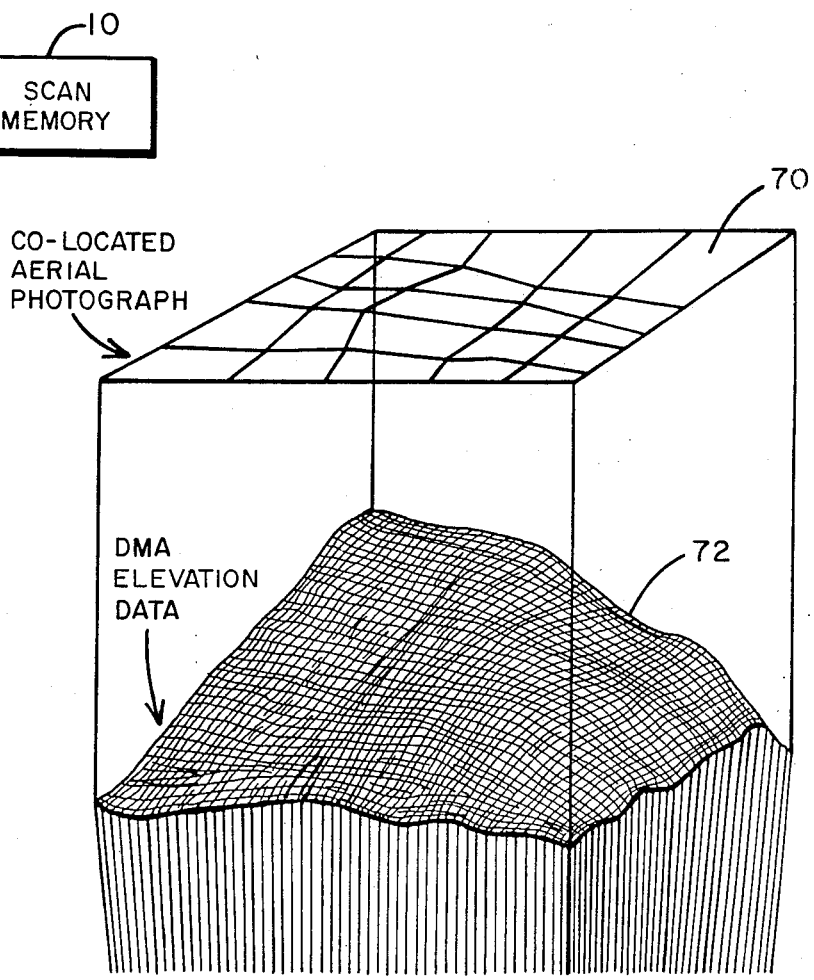
FIG. 2 graphically illustrates DMA elevation information and its co-located aerial photograph which is used by the method of the invention to generate side-looking imagery.

Referring now to FIG. 1, a flow chart of the method of the invention for rapid database generation of side-looking imagery is shown. The method comprises the steps of scanning memory 10, removing hidden surfaces 20, dividing layers into cells 30, dividing cells further into triangles 40, projecting vertices 50 and filling triangles 60. In brief, the computer algorithm of the invention as shown in flow chart form in FIG. 1 takes as input, a digitized down-looking aerial photograph which has been combined and registered with DMA terrain data as shown in FIG. 2. The computer algorithm of the invention produces side views of the original, down-looking photograph from any three-dimensional viewpoint. One embodiment of the computer algorithm of the invention, called an RDG-Display algorithm has been implemented in the C Programming language on a Silicon Graphics workstation by Honeywell Inc. of Minneapolis, Minn. The embodiment of the invention as implemented can produce a view of a 512×512 pixel database in 5 seconds. It is believed that the same operation can be accomplished in real time by implementing the RDG-Display algorithm in a very high-speed integrated circuit (VHSIC) An example of such an integrated circuit has been built by Honeywell Inc. and is described in the assignee's co-pending United States patent application Ser. No. 07/307,354, filed Feb. 7, 1989, by Miller et al. which is hereby incorporated by reference. According to FIG. 2, the computer algorithm of the method of the invention assumes that two rectangular layers of co-located data are memory resident The first layer is a digitized photograph 70. The resolution of the photograph is known and expressed as a constant spacing between successive pixels in the image. Each element in the second layer 72 is the elevation of the earth corresponding to the colocated pixel in the photo layer. In the preferred embodiment of the invention, the resolution of the elevation layer 72 must be equal to the resolution of the photo layer 70. That is, the spacing of the photo must be equal to the spacing of the elevation layer. The two layers, when considered together, are deemed to be ortho-rectified. Essentially, these two layers, a first layer of photographic data and the second layer of elevation data, make up the three-dimensional photographic representation of a small piece of the earth's surface. As those skilled in the art will recognize, the elevation data necessary for the computer algorithm has been collected for much of the U.S. and can be purchased from the National Cartographic Information Center (NCIC), for example. High resolution elevation data is also available for Europe and other countries. Of course, the method of the invention is not dependent on NCIC derived elevation data. The data can be derived from other sources, for example, correlation of stereo pairs.

In order to better explain the method of the invention, the invention will be explained in terms of a specific example. Those skilled in the art will recognize that the particular values used in this example are merely by way of illustration and not by way of limitation of the invention. In the particular example to be used, the following criteria apply:

1. The elevation data is expressed as 16 bit integers;
 2. The pixel intensity values in the photo layer are 8 bit integers;
 3. For the purposes of timing, the size of each layer is assumed to be 512×512 picture elements in length;
 4. The earth coordinate system is righthanded; and
 5. The origin of the view screen coordinate system is in the lower lefthand corner.

Figure 3:
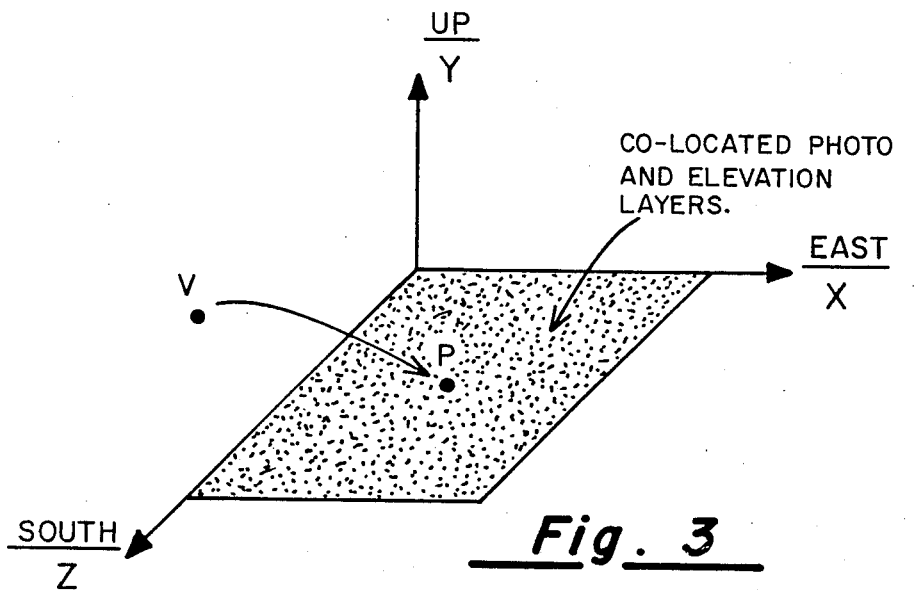
FIG. 3 graphically illustrates a righthanded coordinate system in which the photo and elevation layers as shown in FIG. 2 are placed for use by the method of the invention.

FIG. 3 shows the alignment of DMA elevation segments to the coordinate system used in the discussion of the method of the invention herein.

Figure 4:
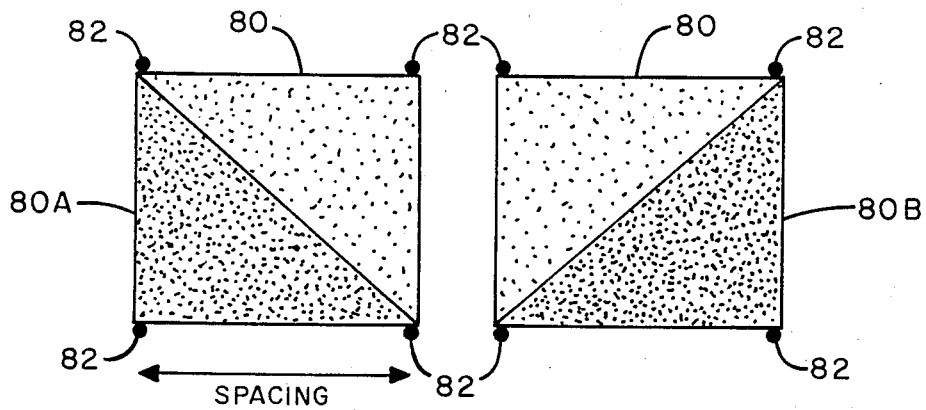
FIG. 4 shows two methods of dividing a 2×2 cell as formed by adjacent pixels in the photo layer wherein each pixel has a corresponding elevation value. Each cell can be divided into two alternate triangular configurations according to the method of the invention.
Figure 11A:
FIG. 11a is a rendering of a downlooking aerial photograph.
Figure 11B:
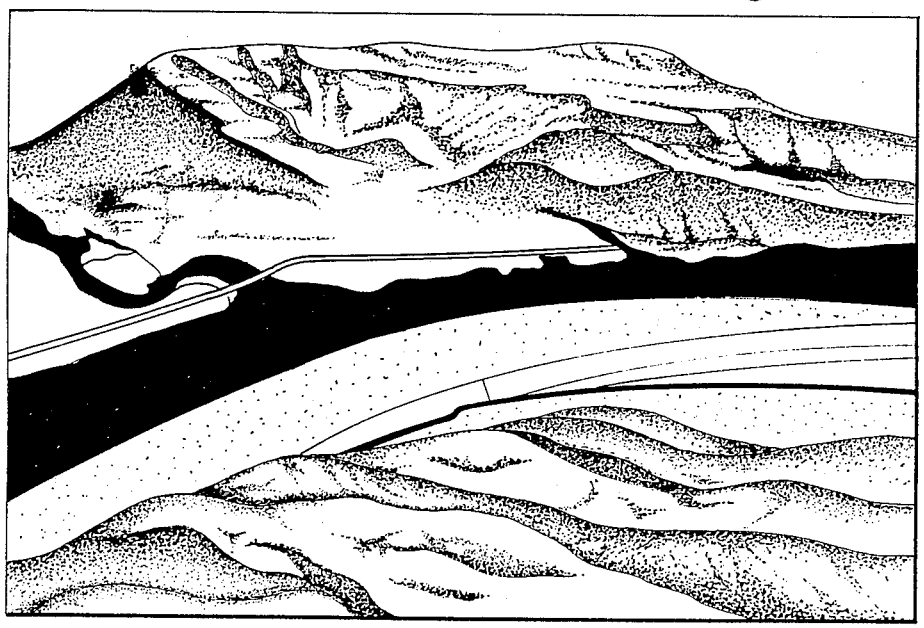
FIG. 11b represents a sample of the type of three-dimensional displays that may be achieved using the image of FIG. 11a with the method of the invention.

Referring now to FIG. 4, two alternate triangular configurations of 2 pixel by 2 pixel cells are shown. Each cell 80 is formed by four adjacent pixels 82. Each cell can be divided into two alternate triangular configurations as shown by 80A and 80B since the four corner points of each cell are not required to lie in the same plane. The vertices of each triangle are first projected to the viewscreen using the coordinates in the elevation layer and the spacing value. The area subtended by the projected vertices is then filled, using the interpolative portion of the Gouraud shading algorithm and the corresponding intensity values from the photo layer. When this "project-and-fill" operation is repeated for all triangles created by the 512×512 elements of the two layers, striking photographic side views are the result as shown in FIG. 11b.

Having generally described an overview of the method of the invention, the steps of the invention will now be described in more detail. Once the memory is scanned for the data to be displayed on the screen at any particular point in time, the first processing step comprising removing hidden surfaces In one alternative embodiment of the invention a Z-buffer can be implemented in hardware. As those who are skilled in the art will recognize, a Z-buffer is a register which stores Z-depth values corresponding to the terrain information being processed for display on the screen. As is well known in the art, a Z-buffer can be used, for example, to suppress writing of certain information to the screen or to a frame memory if it is located behind other data to be displayed at the same time and will be "hidden" by that other data. Suffice it to say that a conventional Z-buffer can be used to provide the hidden surface removal function of the invention.

In another embodiment of the invention, hidden surface removal is accomplished through use of a modified Painters Algorithm. The demonstration software as implemented by Honeywell Inc. in its C language version uses this approach quite effectively. Since the first and second data layers are already organized spatially in the arrays, no sorting is necessary in contrast to the use of the standard Painter's algorithm which may require sorting.

Considering the rectangular photo and elevation layers, the Painters Algorithm operates by drawing the surfaces which are farthest from the viewer first using a well-known drawing technique. Drawing continues toward these surfaces which are closest to the viewer. In essence, the scene is constructed in a "back-to-front" manner. In this manner, surfaces which are hidden are drawn, however, they are covered up when the surfaces closer to the viewer are drawn over the top of the hidden surfaces.

Referring now to FIG. 3, consider the three-dimensional location of the viewer V and the 3D point at which the viewer is looking, P. The vector difference D is equal to P-V. Vector D points in the direction of view given by the polar angle phi, measured from the X and Z components of D:

$$\text{Phi} = \tan^{-1}((Px - Vx)/(Pz - Vz)) \text{ Mod } 360$$

Figure 5:
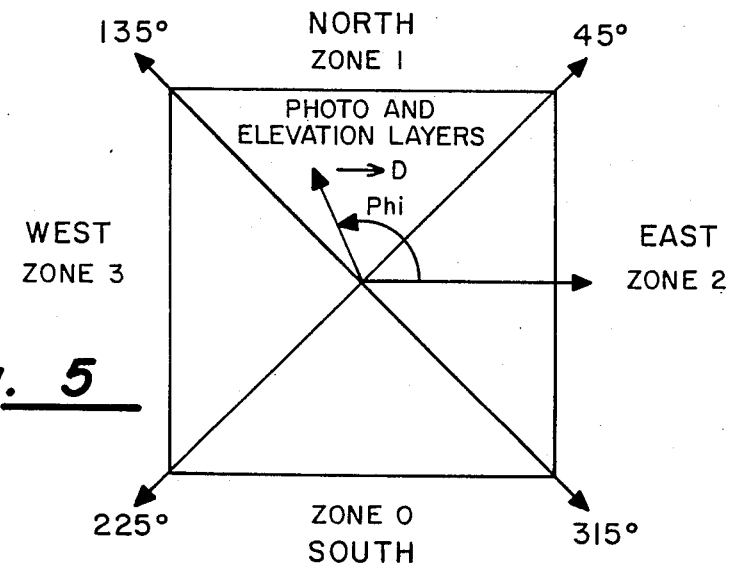
FIG. 5 shows a partitioning of space into four zones based on the polar angle phi derived from the view vector D as used by a modified Painters Algorithm as employed by the method of the invention.

The modified Painters Algorithm is implemented by setting up four cases, depending on the bracketed value of phi. One case is implemented for each side of the rectangular cell defining four zones as shown in FIG. 5.

| Zone | Phi Range | Begin drawing from |
|---|---|---|
| 2 | 315 ≦ phi < 45 | East |
| 1 | 45 ≦ phi < 135 | North |
| 3 | 135 ≦ phi < 225 | West |

| Zone | Phi Range | Begin drawing from |
|---|---|---|
| 0 | $225 \leq phi < 315$ | South |

Figure 9:
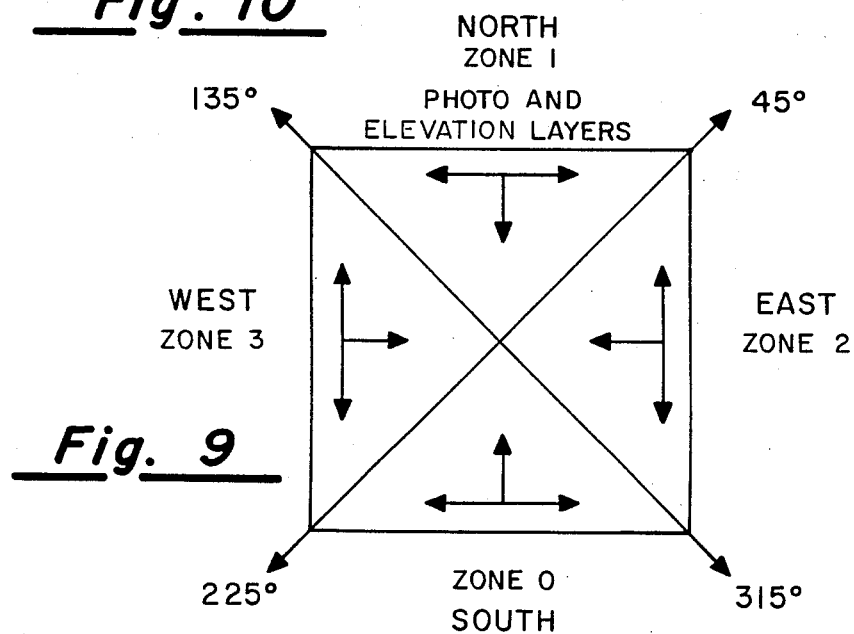
FIG. 9 graphically illustrates the processing directions of the Painters Algorithm as a function of four zones as employed by the method of the invention.

Depending on the value of phi, one of four routines is called to draw the rectangular layers of data. As can be seen from FIG. 7, only two orientations of triangles are needed to satisfy the farthest distance first rule of the Painters Algorithm. Four routines are needed to draw consecutive cells in the proper order one routine for each direction. Aside from orientation differences already noted, the primary difference between each of the four routines is in the order of cell processing. FIG. 9 illustrates the processing directions of the modified Painters Algorithm as a function of the zone.

Figure 6:
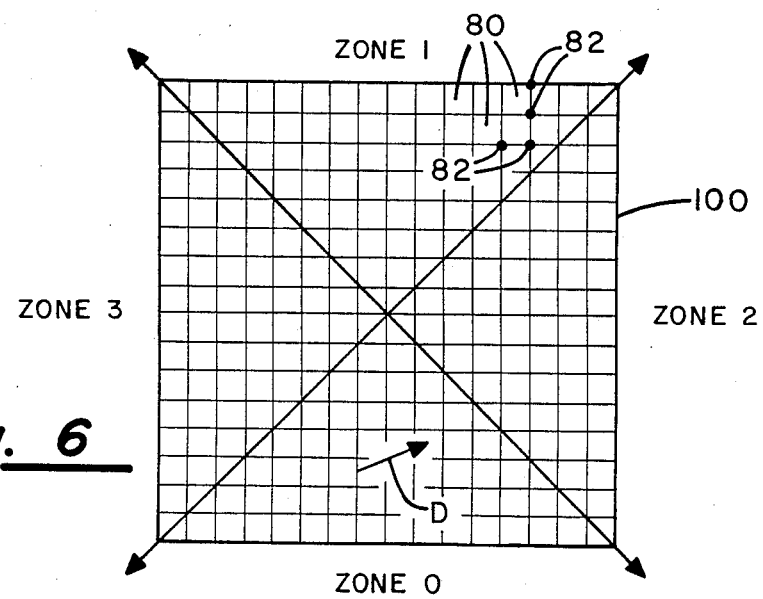
FIG. 6 shows a down-looking view of a rectangular terrain database including small cells representing 2×2 pixel cells wherein a view vector is located in the lower region of the database pointing to the right.

Referring again to FIG. 6, a down-looking view of a rectangular terrain database is shown. For the purposes of explanation of the modified Painter's Algorithm of the invention, the terrain 100 is assumed to be flat, however, the discussion holds true for terrain databases of arbitrary complexity. The view vector is shown in the lower region of the database, pointing toward the right. The smaller squares represent 2×2 pixel cells 80. The database contains the following information for each vertex 82 of each 2×2 cell 80 in the database:
1. An x, y coordinate, from a spacing parameter which is known a priori.
2. A z coordinate representative of the elevation, which is known from the elevation layer.
3. An intensity value taken from the photo layer.

Figures 7A, 7B:
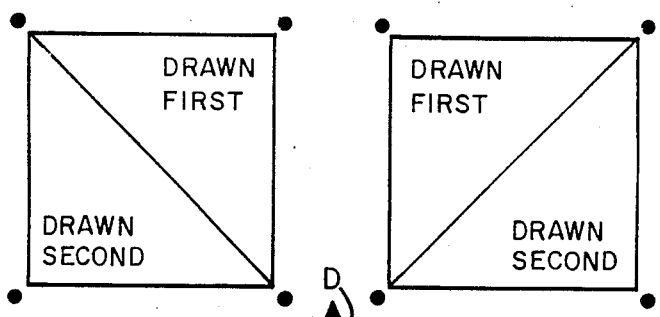
FIG. 7A and 7B shows the order of processing of 2×2 pixel cells using the modified Painter's Algorithm of the invention.

In the using the modified Painter's Algorithm of the invention, first the view vector D is translated to the center of the database as shown, for example, in FIG. 5, and the zone which contains the translated view vector is determined using the angle phi. Next, the appropriate zone related drawing procedure is selected as shown in FIG. 9. The appropriate view of the terrain is then drawn, one cell at a time. As shown in FIG. 7, each cell is drawn by first decomposing cell drawing operation into two triangular drawing operations. Once the appropriate drawing procedure has been selected, there are two possible methods to draw the cell, one method uses a diagonal which traverses the cell from upper left to lower right as in FIG. 7(a), the other method uses a diagonal which traverses the cell from lower left to upper right as in FIG. 7(b). Within a single cell, experimentation has shown that either diagonal may be chosen for all cells within all zones without consequence. What is important in all zones is that the two triangles within a cell be drawn in proper order. In all cases, the triangle which is located the greater distance from the view vector D must be drawn first. In addition, the rows of cells which are farthest away from the viewer must be drawn prior those rows of cells closest to the viewer. Further, the diagonal chosen for all zones must be consistent to avoid artifacts during real-time image generations.

One great advantage of this approach is that the database need not be sorted to determine which of the cells are drawn, since the data and photo layers are stored in computer memory in a spatially ordered manner. All four cases, or zones, may be drawn using a memory which can scan successive lines of cells in forward or reverse directions, or scan columns of cells in forward or reverse directions. This four mode memory read capability corresponds to the four zones discussed previously, and has been implemented in the demonstration software.

Consider a simulated vehicle "flying" through the terrain database. As phi varies, and the photographic image is drawn, transitions will occur at some point between the four drawing procedures. It has been shown by demonstration that as long as the diagonal chosen for all cells in all zones is consistent, transitions between drawing procedures corresponding to each zone produces no artifacts, that is, the consecutive scenes produced by a transition from zone 1 to zone 2 will not be visible or detectable by the human eye. This quality is desirable and makes the approach described here highly suitable for flight simulator applications.

Figure 8:
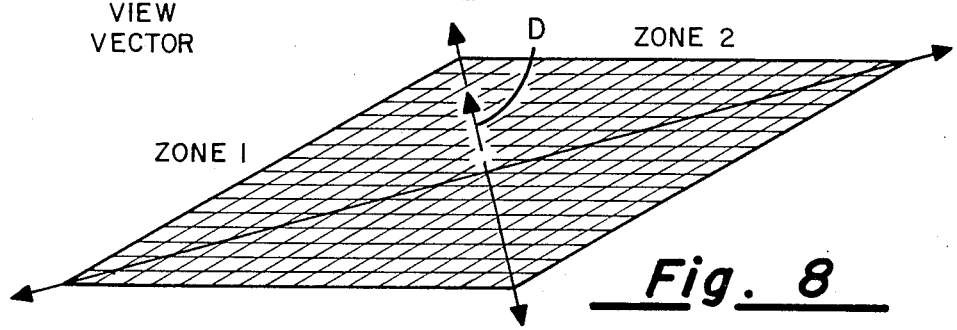
FIG. 8 illustrates the case wherein the view vector is aligned along the boundary between the zones in space partitioned according to the method of the invention.

Consider one of the four boundary conditions illustrated in FIG. 8. FIG. 8 displays the database shown in FIG. 6 from a viewpoint along the view vector. In this case, the view vector D lies precisely along the boundary joining zone 1 and zone 2. In this case, the drawing procedure from either zone 1 or zone 2 may be chosen, without generating artifacts which will appear as distractions to the viewer.

Having described the hidden surface removal techniques as employed by the computer algorithm of the method of the invention, the graphical operations required for each triangle will now be described in detail. The operations required for each triangle are:
1. Projecting the three vertices to the screen for each triangle; and
2. Filling the project triangle using an interpolative or modified Gouraud shading.

With respect to the first step of projecting the vertices to the screen, the perspective transformation matrix must be multiplied by every three-dimensional triangular vertex. The contents of the transformation matrix itself are determined only one time per frame and the use of such transformation matrixes are well known in the art. After taking into account all rotations, translation, transformation from the viewer coordinate system, and projection to the viewscreen, the final matrix has the following form:

| r11 | r12 | r13 | 0 |
|---|---|---|---|
| r21 | r22 | r23 | 0 |
| r31 | r32 | r33 | 0 |
| tx | ty | tz | 1 |

Since the r terms are products of sine and cosine, they should lie between the values 0 and 1. All matrix coefficients are 32 bit floating point values for the purposes of this example. For the example of a 512×512 pixel layer, 262,144 matrix multiply operations must occur to project all triangles to the screen.

Having projected the triangular vertices to the viewscreen, the filling operation is now carried out by the method of the invention. Once projected to the screen, a two-dimensional triangle results. This triangle is filled using a modified Gouraud shading algorithm. In its purest form, Gouraud shading contains four steps, the first three of which result in intensities for each vertex. In applying the well-known Gouraud shading method to the three-dimensional images being generated by the method of the invention, the intensities are already known since they are obtained directly from the photo layer. In an alternate embodiment of the invention, a lighting model may be added. The lighting model essentially would consist of determining first, a surface normal (cross product) and second, a lighting intensity from the surface normal and the light vector (dot product). The lighting value is then factored with the intensities during the filling operation. This operation must be calculated once per triangle.

Figure 10:
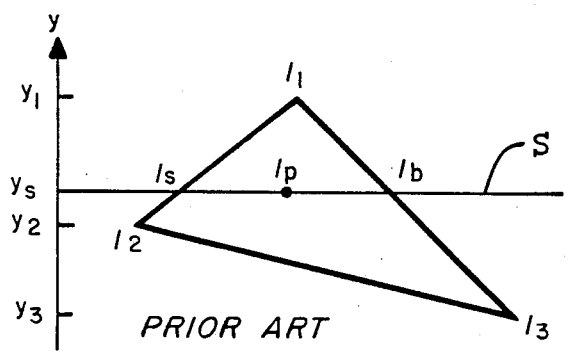
FIG. 10 illustrates a known method of intensity interpolation along triangle edges.

Consequently, the remaining operation is the well known triangle filling operation as shown in FIG. 10, which is essentially a bi-linear interpolation. The interpolation first occurs along the triangle edges, then occurs between edges along each scan line in screen space according to the following known equations:

$$I_a = I_1 \frac{y_s - y_2}{y_1 - y_2} + I_2 \frac{y_1 - y_s}{y_1 - y_2}$$

$$I_b = I_1 \frac{y_s - y_3}{y_1 - y_3} + I_3 \frac{y_1 - y_s}{y_1 - y_3}$$

$$I_p = I_a \frac{x_b - x_p}{x_b - x_a} + I_b \frac{x_p - x_a}{x_b - x_a}$$

The above equations give the values for the intensity interpolations along triangle edges wherein the triangle has known intensities at vertices $I_1$, $I_2$ and $I_3$. $I_a$, $I_b$ and $I_p$ are intensities along scan line S and are interpolated from $I_1$, $I_2$ and $I_3$ according to the above equations. This is a well-known technique as employed by the prior art.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for providing rapid generation of photo-realistic imagery for use in a digital display system including a memory which contains first and second ortho-rectified data layers wherein the first data layer comprises a digitized photograph of known resolution and spacing values and the second layer comprises digitized elevation data corresponding to the photograph in the first data layer, the method comprising the steps of:
   (a) scanning corresponding portions of the first and second data layers out of memory;
   (b) dividing the scanned portions into plurality of 2 pixel by 2 pixel cells so as to form the cells using adjacent pixels for the first data layer wherein each cell is comprised of four vertices and wherein each of the four vertices is described by information stored in the memory including:
      (i) an X, Y coordinate, and
      (ii) a Z coordinate representative of its elevation which is known from the elevation layer so as to allow the vertices to lie in different planes;
   (c) further dividing the cells into triangular sections having vertices;
   (d) removing hidden surfaces from the scanned portion
   (e) projecting the vertices into the viewscreen under the coordinates in the second layer and the known values and
   (f) shading the area subtended by the projected vertices.

2. The method of claim 1 wherein the step of shading the area subtended by the projected vertices further includes interpolating intensities according to a modified Gouraud shading algorithm.

3. The method of claims 1 or 2 wherein the step of removing hidden surfaces is carried out by using a modified Painters Algorithm process step.

4. The method of claim 3 wherein the imagery is viewed in relation to a view vector having X and Z components, wherein the view vector points in a direction of view by the polar angle phi which is measured from the X and Z components of the view vector, and the modified Painter's Algorithm comprises an improved Painter's Algorithm comprising the steps of:
   (a) dividing the database into zones wherein each zone is defined by a range of angles;
   (b) translating the view vector to the center of the database;
   (c) determining the zone which contains the translated view vector by calculating the polar angle phi;
   (d) setting up first, second, third and fourth cases wherein the first case comprises initiating drawing from the east if phi is in the range between 315° and 45°, the second case comprises initiating drawing from the north if phi is in the range between 45° and 135°, and third case comprises initiating drawing from the west if phi is in the range between 135° and 225°, and the fourth case comprises initiating drawing from the south if phi is in the range between 225° and 315° so as to eliminate and the need for sorting.

* * * * *

UNITED STATES PATENT AND TRADEMARK OFFICE
CERTIFICATE OF CORRECTION

PATENT NO. : 4,985,854

DATED : January 15, 1991

INVENTOR(S) : Timothy M. Wittenburg

It is certified that error appears in the above-identified patent and that said Letters Patent is hereby corrected as shown below:

Column 8, Line 13, delete the last word of the sentence "under" and replace it with -- using --.

Column 8, Line 44, after the word "initiating" insert -- drawing --.

Signed and Sealed this

Eighteenth Day of August, 1992

*Attest:*

DOUGLAS B. COMER

*Attesting Officer*     Acting Commissioner of Patents and Trademarks